United States Patent
Crowell et al.

(10) Patent No.: US 7,549,574 B2
(45) Date of Patent: Jun. 23, 2009

(54) EMERGENCY SERVICES NOTIFICATION FROM AN ATM SYSTEMS AND METHODS

(75) Inventors: Donald R. Crowell, Glassboro, NJ (US); Kenneth Algiene, Littleton, CO (US)

(73) Assignee: First Data Corporation, Greenwood Village, CO (US)

( * ) Notice: Subject to any disclaimer, the term of this patent is extended or adjusted under 35 U.S.C. 154(b) by 279 days.

(21) Appl. No.: 11/534,530

(22) Filed: Sep. 22, 2006

(65) Prior Publication Data

US 2007/0083466 A1    Apr. 12, 2007

Related U.S. Application Data

(63) Continuation-in-part of application No. 11/248,919, filed on Oct. 11, 2005.

(51) Int. Cl.
 *G06Q 40/00* (2006.01)
 *G07D 11/00* (2006.01)
 *G07F 19/00* (2006.01)

(52) U.S. Cl. ............... 235/379; 235/375; 235/382

(58) Field of Classification Search ........... 235/379, 235/375, 382; 705/44, 43, 72
See application file for complete search history.

(56) References Cited

U.S. PATENT DOCUMENTS 5,354,974 A * 10/1994 Eisenberg .................. 235/379
6,073,106 A * 6/2000 Rozen et al. ................. 705/3
6,246,769 B1 * 6/2001 Kohut ....................... 380/45
6,776,332 B2 * 8/2004 Allen et al. ............... 235/380
2001/0051920 A1  12/2001 Joao et al.
2002/0170954 A1  11/2002 Zingher et al.
2003/0195850 A1 * 10/2003 Stallworth ................. 705/43
2005/0065885 A1 * 3/2005 Gordon .................... 705/43
2005/0091110 A1  4/2005 Hentz et al.
2008/0075235 A1 * 3/2008 Russikoff ................. 379/45
2008/0195540 A1 * 8/2008 Gee et al. ................. 705/43

OTHER PUBLICATIONS

International Search Report and Written Opinion of the International Search Authority dated Sep. 24, 2007 corresponding to PCT International Application No. PCT/US06/39617, filed Oct. 10, 2006.

* cited by examiner

*Primary Examiner*—Edwyn Labaze
(74) *Attorney, Agent, or Firm*—Townsend and Townsend and Crew LLP

(57) ABSTRACT

Systems, methods, and software are described for facilitating contact with an emergency services provider from an ATM. An ATM network host computer system may receive a first communications signal from the ATM, comprising a request for emergency services. The ATM network host may determine at least one financial account associated with the user. The ATM network Host may then transmit a second communications signal directed at the financial institution to freeze the user's account.

18 Claims, 8 Drawing Sheets

EMERGENCY SERVICES NOTIFICATION FROM AN ATM SYSTEMS AND METHODS

CROSS-REFERENCES TO RELATED APPLICATIONS

This application is a continuation-in-part application and claims the benefit of co-pending U.S. patent application Ser. No. 11/248,919, filed Oct. 11, 2005, the complete disclosure of which is herein incorporated by reference.

This application is also related to "MULTI-PURPOSE KIOSK AND METHODS," U.S. application Ser. No. 10/225,410, filed Aug. 20, 2002, the complete disclosure of which is incorporated herein by reference.

BACKGROUND OF THE INVENTION

Automatic Teller Machines ("ATMs") are widely used by customers of financial institutions to perform transactions related to financial accounts. ATMs may be used for a variety of purposes, including the deposit or withdrawal of funds to such financial accounts. ATM's may also be used for credit card cash advances and other transactions, money transfers, payments (e.g., payment of a bill), balance inquiries, item purchase items (e.g., stamps), and other types of transactions involving the making and receiving of payments. One of the most common transactions involves the withdrawal of money from a checking or savings account. The customer may insert an ATM card and input a personal identification number ("PIN"), and may enter the desired withdrawal amount. If the transaction is approved, the requested amount is distributed. The withdrawal amount may then be deducted from the customer's account.

One advantage of an ATM is that the transaction may be performed automatically, and yet this fact may also be a source of potential harm. ATMs may allow the withdrawal of funds without interaction with any bank teller or other person. A growing problem has arisen around this fact, as ATM customers are susceptible to being required to withdraw money via the ATM under threat of immediate physical harm. This situation, therefore, is made worse by the fact that there is often no way to notify authorities about this ongoing crime because of the automatic nature of the transaction. There is, thus, a need in the art for improved systems and methods to notify emergency service providers of the need for emergency services at an ATM.

BRIEF SUMMARY OF THE INVENTION

According to various embodiments of the invention, an ATM network host computer system may receive a first communications signal from an ATM, the signal comprising a request for emergency services. The ATM network host may determine an emergency services provider providing service to a geographic region which includes the ATM. The ATM network host may then transmit a second communications signal directed at the emergency services provider, wherein the second communications signal comprises the request for emergency services and the location of the ATM.

According to some embodiments, the request for emergency services may simply comprise input of a personal identification number ("PIN") by a user to the ATM. The first communications signal may, thus, comprise an encrypted, formatted message including an ATM card number, a personal identification number ("PIN"), and an identifier for the ATM. Location information for the ATM may also be included in the communications signal. According to certain embodiments of the invention, a user may be associated with a first PIN and a second emergency PIN which both authorize an ATM transaction, wherein selection of the emergency PIN initiates a request for emergency services without any notice at the ATM. In various embodiments, the request for emergency services comprises a response to a query displayed at the ATM to ascertain whether emergency services are required. A response to such a query may comprise selection of an option from a graphical menu displayed on a screen of the ATM.

In certain embodiments, a Public Safety Answering Point ("PSAP") may comprise an intermediary between the ATM and the emergency service provider, or may, alternatively, comprise the emergency services provider itself. In some embodiments, the emergency services provider is determined by communication with a database which stores information on a plurality of emergency services providers, wherein each provider provides service to a different geographic region. In various embodiments, the emergency service provider may be selected by matching the zip code of the ATM with the zip code of a provider stored in the database. In certain embodiments, a voice response unit, in communication with the ATM network host, transmits the request on behalf of the host. In other embodiments, the request for emergency services comprises transmission of an electronic message.

According to various embodiments of the invention, the request for emergency services may include personal information relating to the user. In such embodiments, a database may be configured to store personal information related to each of a plurality of users. In other embodiments, the host may also be configured to establish a two-way communication connection between the ATM and the emergency services provider, which may comprise voice, text, or video communication.

In other embodiments, the ATM network host computer system may use the request for emergency services to notify one or more financial institutions that the user's financial account information may have been stolen or otherwise compromised. To do so, the host computer system may query a database to determine financial accounts associated with the user, and their associated financial institutions. A notification may then be sent, permitting the financial institutions to take appropriate actions, such as by flagging the accounts, freezing or limiting access to funds and the like. Examples of such financial accounts that may be involved include credit card accounts, debit accounts, stored value accounts, phone accounts, savings accounts, checking accounts and the like.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following systems, methods, or software.

I. Overview: Systems, methods, and software are described for facilitating contact with an emergency services provider from an ATM. According to certain embodiments of the invention, the ATM network host computer system may receive a first communications signal from the ATM comprising a request for emergency services. The ATM network host may determine an emergency services provider providing service to a geographic region which includes the ATM. The ATM network host may then transmit a second communications signal directed at the emergency services provider, wherein the second communications signal comprises the request for emergency services and the location of the ATM.

In some embodiments, the ATM network host may use the first communications signal to determine any financial accounts associated with the user, as well as their associated financial institutions. The ATM network host may then transmit a second communications signal to the financial institutions associated with the user's financial accounts. In this way, if the user's financial account information has been stolen or comprised, the user can enter an emergency signal into an ATM to notify the user's financial institutions of such an event. The user's financial institutions may then take appropriate actions, such as by freezing funds, calling or emailing the user to confirm actions should be taken, limiting fund withdrawals and the like. Hence, if a user operating an ATM is approached by a suspicious person, the user may enter an emergency code or PIN to not only notify law enforcement, but also the user's financial institutions so that funds may not be stolen or withdrawn.

Figure 1A:
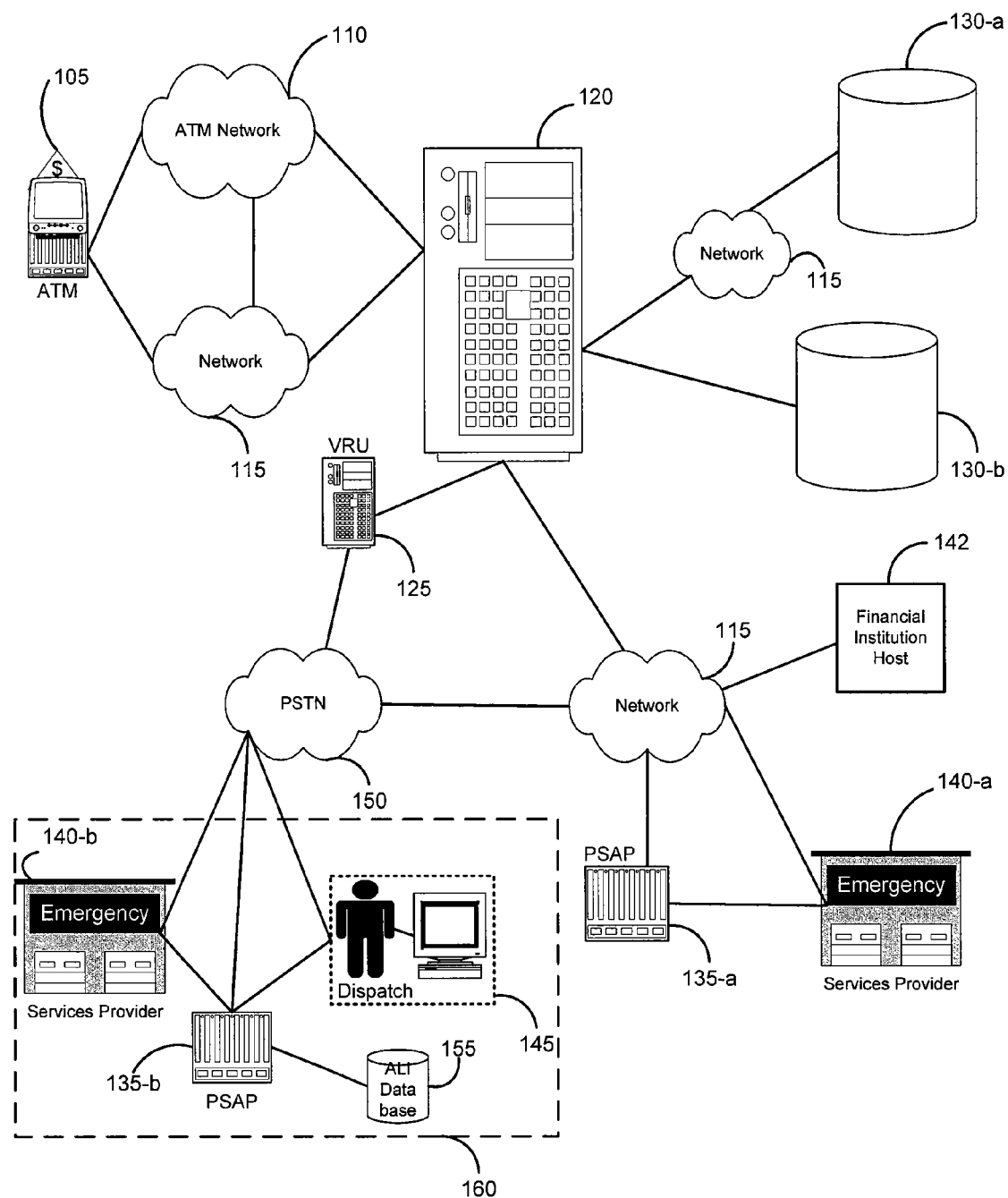
FIG. 1A illustrates a communications system that may be used to contact an emergency services provider from an ATM according to various embodiments of the present invention.

II. System Architecture: FIG. 1A illustrates an example of a Communications System 100 within which various embodiments of the present invention may be included. The System 100 components may be directly connected, or may be connected via a Network 115, which may be any combination of the following: the Internet, an IP network, an intranet, a wide-area network ("WAN"), a local-area network ("LAN"), a virtual private network, the Public Switched Telephone Network ("PSTN"), an ATM network, or any other type of network supporting data communication between devices described herein, in different embodiments. A Network 115 may include both wired and wireless connections, including optical links. Many other examples are possible and apparent to those skilled in the art in light of this disclosure. In the discussion that follows, a Network 115 may or may not be noted specifically. If no specific means of connection is noted, it may be assumed that the link, communication or other connection between devices may be via a Network 115.

Figure 1B:
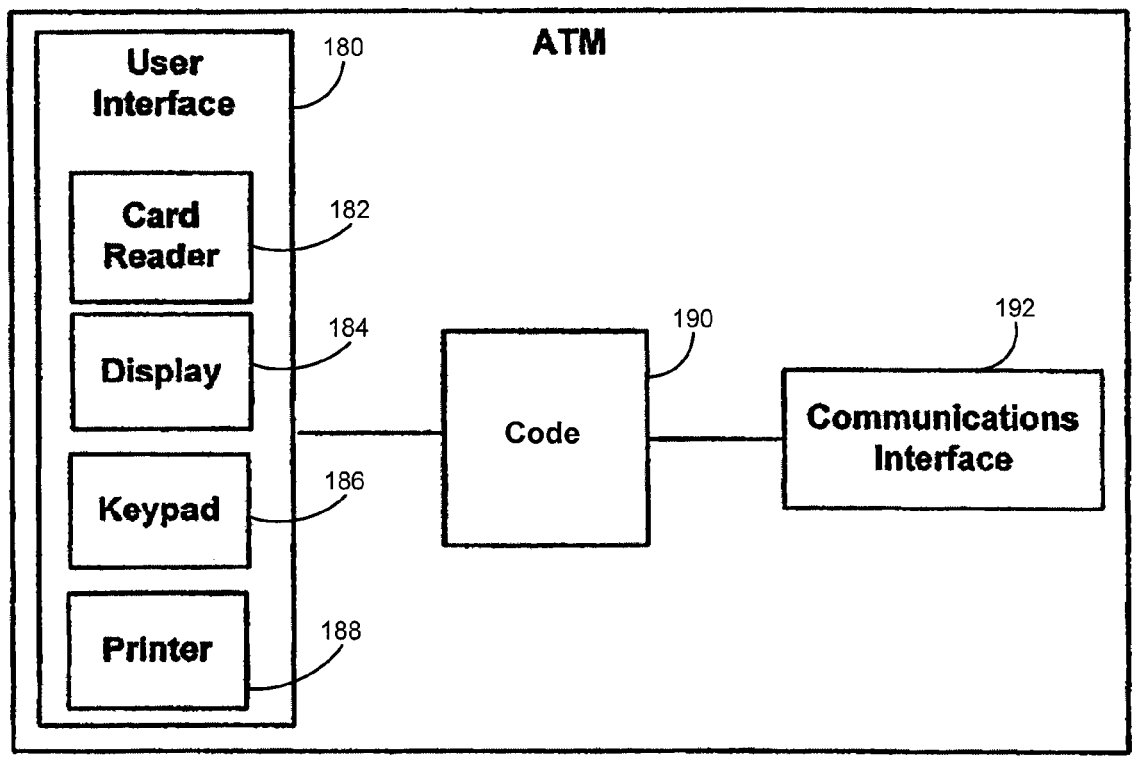
FIG. 1B is a schematic diagram of an exemplary ATM that may be used to contact an emergency services provider according to various embodiments of the present invention.

1. ATM: The System 100 may include an ATM 105. An ATM 105 may comprise a machine, kiosk, or other apparatus which automatically dispenses cash upon certain user input and authentication procedures. FIG. 1B illustrates an exemplary block diagram 175 of an ATM 105 that may be used to facilitate communication with an emergency services provider 140 or to provide other emergency services. An ATM 105 may include a user interface 180. A user interface 180 may comprise multiple components, such as a card reader 182, display 184, keypad 186, and printer 188. A card reader 182 may be used to receive a card (e.g., ATM card, credit card, driver's license, smartcard, etc.) to obtain a financial account number, card number, or other identifier to identify the account for which the transaction will take place. A biometric input device may receive biometric information, and biometric authentication may be used in conjunction with, or in place of, a card reader. A variety of such biometric input devices are known in the art. A display 184 may be used to prompt a user for responses needed to perform a transaction, and to display information to the user. Additionally, as will be described in further detail below, a display 184 may be used to display a query from an ATM Network Host Computer System 120.

A keypad 186 may be used to receive input from the user, such as a personal identification number ("PIN") associated with the user's financial account, transaction selections, dollar amounts for transactions, emergency information, and other information related to a user's transaction with the ATM 105. A keypad 186 (which may optionally comprise a touch-screen, either stand alone or a component of the display) may be used to receive input from a user comprising a request to contact an emergency services provider 140. A user interface 180 may also include a printer 188 that may be used to print a receipt of a transaction. Other items, such as a microphone and speaker, or a video camera, may be integrated into or otherwise coupled with a user interface 180.

An ATM 105 may further include code ("ATM code") 190 stored on a storage medium associated with the ATM 105, and such code may include programs or applications designed to implement methods of the invention. An ATM 105 may comprise a computing device, as described below, and, thus, may further include a processor, and a communications interface 192. The ATM code 190 may be used to process a transaction or other request initiated by a user of the ATM 105. The ATM code 190 may direct the display to show a query to a customer regarding whether he or she is in need of emergency services, or may be written to direct the display of such a query originating from an ATM Network Host 120. The ATM code 190 may receive a request from a user, via the user interface 180, to contact emergency services (e.g., via entry of the emergency PIN, in response to a request, etc.), and use the communications interface 192 to communicate with an ATM Network Host Computer System 120 though the ATM network 110 or other Network 115. The ATM code 190 may encrypt or decrypt any portion of a communications signal to be sent or received via the communications interface 275. It should also be appreciated that in alternate embodiments, the ATM 105 may comprise fewer or additional components than described above.

A request for emergency services may be initiated with a number of different actions at the ATM 105. By way of example, a request for emergency services may comprise the input of a PIN. According to certain embodiments of the invention, a user may be associated with a first "traditional" PIN configured to authorize a transaction at an ATM 105. A second, different "emergency" PIN may be associated with a user which will also authorize an ATM transaction, but selection of the emergency PIN may also initiate a request for emergency services without any notice at the ATM 105. This process will be described in greater detail below. In various embodiments, a request for emergency services may comprise a response to a query displayed at the ATM 105 to ascertain whether emergency services are required. In still other embodiments, the request may further comprise keypad, voice or other input indicating the need for emergency services, the nature of the emergency, or information describing the specific needs. There are a variety of potential configurations of the ATM 105 or the ATM code 190 in which to receive such a request. However, with certain configuration (such as the traditional/emergency PIN configuration described above), no reconfiguration of an ATM 105 is required.

There are a number of ways in which a request for emergency services may be transmitted from an ATM 105 to an ATM Network Host 120. The request may be transmitted in a communications signal. A communications signal, as that term is used throughout the Application, may comprise any number of signals (i.e., the information may be sent in any number of different signals or packets). The communications signal may comprise an encrypted, formatted message including an ATM card number, a PIN, and an identifier for the ATM 105. Other information may be included in addition to, or instead of, this information, such as the location of the ATM 105. As the term is used herein, an "encrypted, formatted message" may include any formatted message in which any part of the message is encrypted. In some embodiments, only the PIN is encrypted. As the term is used herein, "location of the ATM" specifically may comprise any of the following: 1) an address, 2) an identifier which allows the ATM Network Host 120 to query a Database 130 to determine the location of the ATM 105, as discussed below, 3) a phone number for the ATM 105 sufficient to allow an ALI database to identify the location, 4) GPS or other location information which otherwise allows the ATM Network Host 120 to determine the location of the ATM 105.

There are a number of additional actions that may be taken by an ATM 105 in response to a request for emergency services. Such responses may be programmed into the ATM Code 190, or the ATM 105 may be directed to take such action by the ATM Network Host 120. In response to the request for emergency services, an ATM 105 may limit the amount of cash available for dispersal. Such a limit may be a flat amount for each customer, may be customer specific, or may be related to the time of day or the location of the transaction. In some embodiments, the ATM may delay dispensing the cash in response to a request for emergency services. A display may provide a message indicating, by way of example, "please wait" or "transaction processing." Alternatively, in response to a request for emergency services, an ATM may activate a video camera, or otherwise take pictures with another camera, either of which may be communicatively coupled with the ATM 105 or ATM Network Host 120. In some cases, the ATM may transmit a signal that may be used to notify other financial institutions about the request for emergency services. If the user has accounts with these financial institutions, such accounts may be treated according to pre-established rules. For example, the accounts may be frozen until released by the user or the value that may be withdrawn may be limited.

2. ATM Network: The communications interface 192 may be directly or indirectly communicatively coupled with ATM network 110 to provide for communication with an ATM Network Host 120. By way of example, the communications interface 192 may comprise a modem, a network interface card, or other wireless card connecting the ATM 105 to a phone line, a 4 wire dedicated phone line, a dedicated data line, a wireless network, an optical network, or other communication medium known in the art. ATM code 190 may use the communications interface 192 to communicate with the ATM Network Host 120 to thereby authenticate a user's financial account number and PIN, approve a transaction, or transmit a request for emergency services. Other information may also be requested and received using the communications interface 192. By way of example, two-way voice, text message, or other electronic communication between the ATM 105 and the emergency services provider 140 may be conducted via the communications interface 192 as well.

As noted above, an ATM 105 may have a direct, or indirect, communication coupling to an ATM network 110. Therefore, the communications interface 192 may be communicatively coupled with an other Network 115, and such a Network 115 may be communicatively coupled with the ATM network 110. For example, an ATM 105 may be communicatively coupled to ATM network 110 through a Network 115 of a financial institution associated with the ATM 105. By way of example, the ATM network 110 may comprise a network such as the NYCE® network, the Pulse® network, the STAR® network, and the like. An ATM 105 may also be communicatively coupled directly with a Network 115 of a financial institution associated with the ATM 105. A variety of combinations are possible, and apparent to those skilled in the art.

3. ATM Network Host and Database: The ATM Network Host Computer System 120 may receive a request to contact an emergency services provider 140 or to provide other emergency services, or may receive the request via other means. The ATM Network Host 120 may include, for example, one or more server computers, workstations, web servers, or other suitable computing devices. The ATM Network Host 120 may be fully located within a single facility or distributed geographically, in which case an ATM network 110 or other Network 115, as described above, may be used to integrate different components. An ATM Network Host 120 may comprise any computing device configured to process, manage, complete, analyze, or otherwise address a request to authenticate an ATM user, a request to authorize a transaction, a request to notify financial institutions of compromised accounts, or a request to contact an emergency services provider 140 from an ATM 105, either directly or indirectly.

Application software running on the ATM Network Host 120 may receive a request to contact an emergency services provider 140, query the Database 130 to identify an emergency services provider 140 serving the location of the ATM 105, and transmit the request for emergency services and the location of the ATM 105 to the identified emergency services provider 140. Such software may also include the functionality to receive a request to authorize a transaction, and may authorize the transaction as appropriate.

In some embodiments, an ATM Network Host 120 receives a communications signal from the ATM 105. In some embodiments, the signal may comprise an encrypted, formatted message which includes an ATM card number, a personal identification number ("PIN"), and an identifier for the ATM 105. As noted above, an "encrypted, formatted message" may include any formatted message in which any part of the message is encrypted. In some embodiments, only the PIN is encrypted. The request may also contain other information, such as the location of the ATM 105. The ATM Network Host 120 may decrypt the signal, and process the formatted message to determine whether the PIN matches the standard (i.e., traditional) PIN associated with the card number. If not, a check for the emergency PIN may be conducted, and if matched, the transaction may be approved. However, an emergency services provider 140 may also be contacted. In certain embodiments, the address of the ATM 105 and notice of use of the emergency PIN are transmitted to the emergency services provider 140. Also, the user card number, issuing bank, date, time, or any combination of this or other information may be provided as well. According to various embodiments of the invention, the ATM Network Host 120 may receive the request for emergency services in response to a query at the ATM 105, or in any manner otherwise apparent to those skilled in the art. Similar information may be transmitted to the appropriate emergency services provider 140 in such circumstances.

An ATM Network Host 120 may be in communication with a Database 130, which maintains or otherwise stores information on a plurality of emergency service providers 140. The Database 130 may comprise one or more different databases, which may be located within a single facility or distributed geographically, in which case a Network 115, as described above, may be used to integrate different components. According to different embodiments of the invention, the Database 130 may include any number of tables and sets of tables. One or more of the databases may be a relational database. The Database 130 may be incorporated within the ATM Network Host 120 (e.g., within its storage media), or may be a part of a separate system. The ATM Network Host 120 may, therefore, comprise the Database 130. The Database 130 may be organized in any manner different than described above to provide the functionality called for by the various embodiments, as known by those skilled in the art.

The Database 130 may contain information related to the plurality of emergency service providers 140 described above. The Database 130 may include information related to the geographic region or regions served by each provider, and the services (e.g., fire, police, ambulance, etc.) provided by each provider. In some embodiments, a region may comprise one or more zip codes or portions thereof. The Database 130 may further include contact information and preferences for each provider. In various embodiments, the ATM Network Host 120 includes application software comprising complex mapping functionality in order to evaluate and compare the location of an ATM 105 with the geographic regions served by the different providers. Such mapping tools are well known in the art. The geographic regions served by each provider may vary with time or other factors. The functionality included in the tools may, thus, include the ability to formulate boundaries of geographic regions given certain rules governing their formation. Any number of inputs may dictate how such boundaries will be formed. There are a variety of ways known in the art to create variable boundaries of geographic regions based on different input parameters. One skilled in the art will recognize how such tools may be utilized in various embodiments of the invention.

The Database 130 may also contain information related to the location of a plurality of ATMs 105. In such embodiments, the ATM Network Host 120 may receive the request to contact emergency services with an ATM identifier. The ATM identifier may be a group of numbers or characters, or other unique data set, which specifically identifies the particular ATM 105. The ATM Network Host 120 may query the database to match the identifier with the particular ATM 105 and associated location. The location information may include the address, city, state, zip code, map of the geographic region surrounding the location, architectural or other plans, or other information. Any combination of the foregoing location information for the ATM 105 may be transmitted to the emergency services provider 140. In some embodiments, the Database 130 may be queried to match the zip code of an ATM 105 location with the zip code included in the region of service for an emergency services provider 140.

The Database 130 may also contain personal information related to each of a plurality of users. Such personal information may include, by way of example, a listing of medical conditions, a listing of allergies, a listing of medications, contact information for a doctor or other medical professional, a listing of emergency contacts, personal information (name, home address, work address, age, gender, height, weight, additional description), special medical directions, any other related information, or any part or combination thereof. Each user of the plurality may be associated with at least one identifier, such as an ATM card account number, a credit card account number, a social security number, a bank account number, a savings account number, a stored-value account number, a personal identification number, a unique character set, a unique data set, or any combination thereof. When a request for emergency services is received that includes an identifier, the ATM Network Host 120 may be configured to query the Database 130 to match the personal information related to the identifier associated with the user of the ATM 105. The ATM Network Host 120 may then transmit a subset of the information with the request to the emergency services provider 140.

The ATM Network Host 120 may be communicatively coupled to a Network 115 to allow communication with an emergency services provider 140. As noted above, the ATM Network Host 120 may transmit the request for emergency services, the location of the ATM 105, and other information to an emergency services provider 140. The transmission may comprise an electronic message, such as an e-mail or text message, or may comprise any other form of electronic message. The transmission may also comprise a telephone message from a telephone voice response unit ("VRU") 125 in communication with the emergency services provider 140. In such embodiments, the ATM Network Host 120 may communicate the requisite information to the VRU 125 in data form, and the VRU 125 may create an audio message based on the data. A number of such units are commercially available, and such technology is well known in the art. In still other embodiments, the ATM Network Host 120 may be in communication with a service center with human operators to contact the appropriate emergency services provider 140.

In some cases, the request for emergency services may involve contacting one or more financial institutions to notify those institutions of accounts that may have been compromised. For example, account information may have been stolen and may in the future be used to withdraw value from the associated accounts. In such cases, ATM 105 may be used to contact those financial institutions to notify them of the issues. This may be done by communication with one or more financial institution host computer systems 142, such as by using network 115. Also, Database 130 may include information on a user's financial accounts and associated financial institutions. In this way, when an emergency request is input into ATM 105, a query may be performed to identify the user's financial accounts. Either by pre-registering or by selecting an option at ATM 105, a request may be generated to send a communication to financial institution host computer system 132 regarding the emergency request. Based on the user's relationship with the financial information, various actions may be taken in relation to the account. For instance, all funds associated with the account may be frozen until the user dictates otherwise, or they may be frozen for only a certain amount of time. As another option, only a certain portion of the funds may be available for withdrawal.

As one example, a user accessing ATM may have his wallet stolen (either before or during an ATM transaction). By entering an emergency request using any of the techniques described herein, Database 130 may perform a search to determine that the user has a credit card with a bank and cell phone minutes with a phone company. ATM Network Host 120 may send a request to each of these institutions so that a credit card account may not be charged and no minutes may be used off the cell phone account.

In some cases, ATM Network Host 120 could be used to notify the user of the emergency actions. For example, VRU 125 could call the user (or a designee of the user) to make the notification. Other notification techniques include e-mail, fax, text messages and the like.

4. Emergency Services Provider: According to various embodiments of the invention, an emergency services provider 140 may comprise a Public Safety Answering Point ("PSAP"), PSAP operator, other emergency dispatcher, police, fire, ambulance, hospital, private security service, or other local, state, or federal authorities. An ATM Network Host 120 may communicate with an emergency services provider 140 over a Network 115 (including the PSTN 150), and the transmission may be directly from the ATM Network Host 120. In some embodiments, the transmission may comprise a telephone call placed to an emergency services provider from a VRU 125. In still other embodiments, the transmission may be routed through one or more intermediaries, wherein the message may be modified before reaching the emergency services provider.

FIG. 1A illustrates some of the variations. For example, an electronic message may be transmitted from the ATM Network Host 120 over the Network 115. The message may comprise the request for emergency services, the location of the ATM 105, and other information. Such a message may be transmitted directly to an emergency services provider 140-*a*. In other embodiments, such a message could first be directed to a PSAP 135-*a* (in this case comprising an intermediate entity), and then forwarded to the emergency services provider 140-*a* serving the location of the ATM 105.

In another embodiment, the VRU 125 may transmit a voice message over the PSTN 150 to a PSAP 135-*b* (comprising the emergency services provider 140 in this embodiment). Alternatively, the voice message may be directed at a dispatcher 145, who may or may not be associated with the PSAP 135-*b*. The dispatcher 145 may direct the PSAP 135-*b* to query the ALI database 155 to display the location information associated with the originating telephone number at the ATM 105. Such information may allow the dispatcher to better direct the emergency services provider 140-*b* to the location associated with the telephone number associated with the ATM 105.

Attention is directed to the area designated by a dashed line and identified by reference numeral 160, which illustrates a group of entities that may each be considered an emergency services provider (i.e., the dispatcher 145 may comprise the provider 140-*b;* or the PSAP 135-*b* and the ALI database 155 may comprise the provider 140-*b*). In other embodiments, however, the dispatcher 145 or PSAP 135-*b* may be serving as intermediaries.

It is assumed that ALI databases, and other databases providing similar location identification functionality, will evolve. There are, thus, a variety of ways to determine the location of the ATM 105. The ATM location may be provided by the ATM 105 or the ATM Network Host 120, or may be determined via a PSAP 135-*b* through an ALI database or other database providing similar functionality. Having described various aspects of the invention, a better understanding of the embodiments of the system may be gained with further discussion of the various methods of facilitating contact, and the systems and software that support them.

Figure 2A:
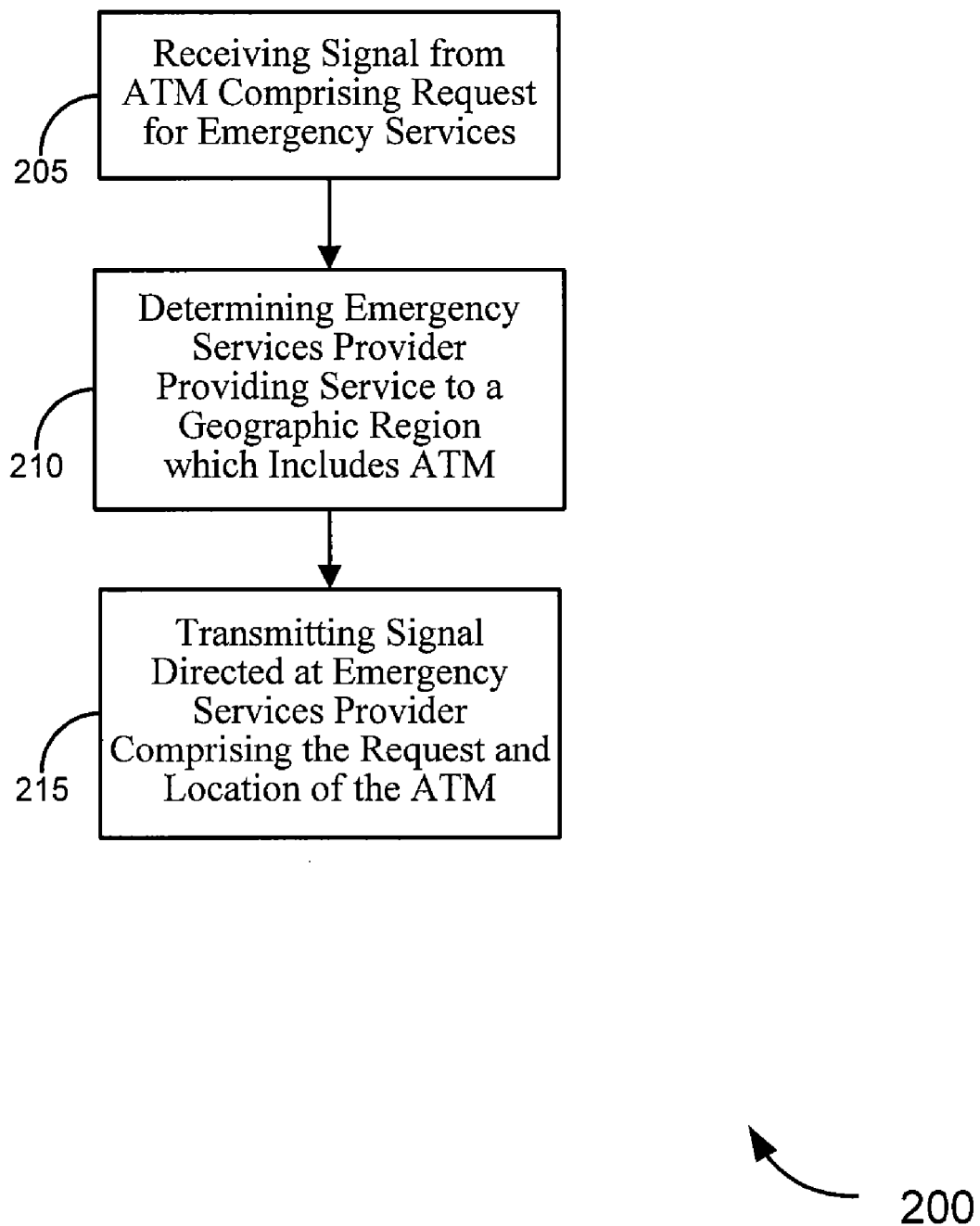
FIG. 2A is a flow diagram that illustrates a method that may be used to facilitate contact with an emergency services provider over an ATM network according to various embodiments of the present invention.

III. Exemplary Embodiments: FIG. 2A sets forth an exemplary embodiment 200 of the invention, illustrating an example of a method for facilitating contact with an emergency services provider from an ATM 105. At block 205, an ATM Network Host 120 may receive a first communications signal from an ATM 105 comprising a request for emergency services. At block 210, the ATM Network Host 120 determines an emergency services provider 140 providing service to the geographic region within which the ATM 105 is located. The ATM Network Host 120 may then, at block 215, transmit a second communications signal directed at the emergency services provider 140, wherein the second communications signal comprises the request for emergency services and the location of the ATM 105.

Figure 2B:
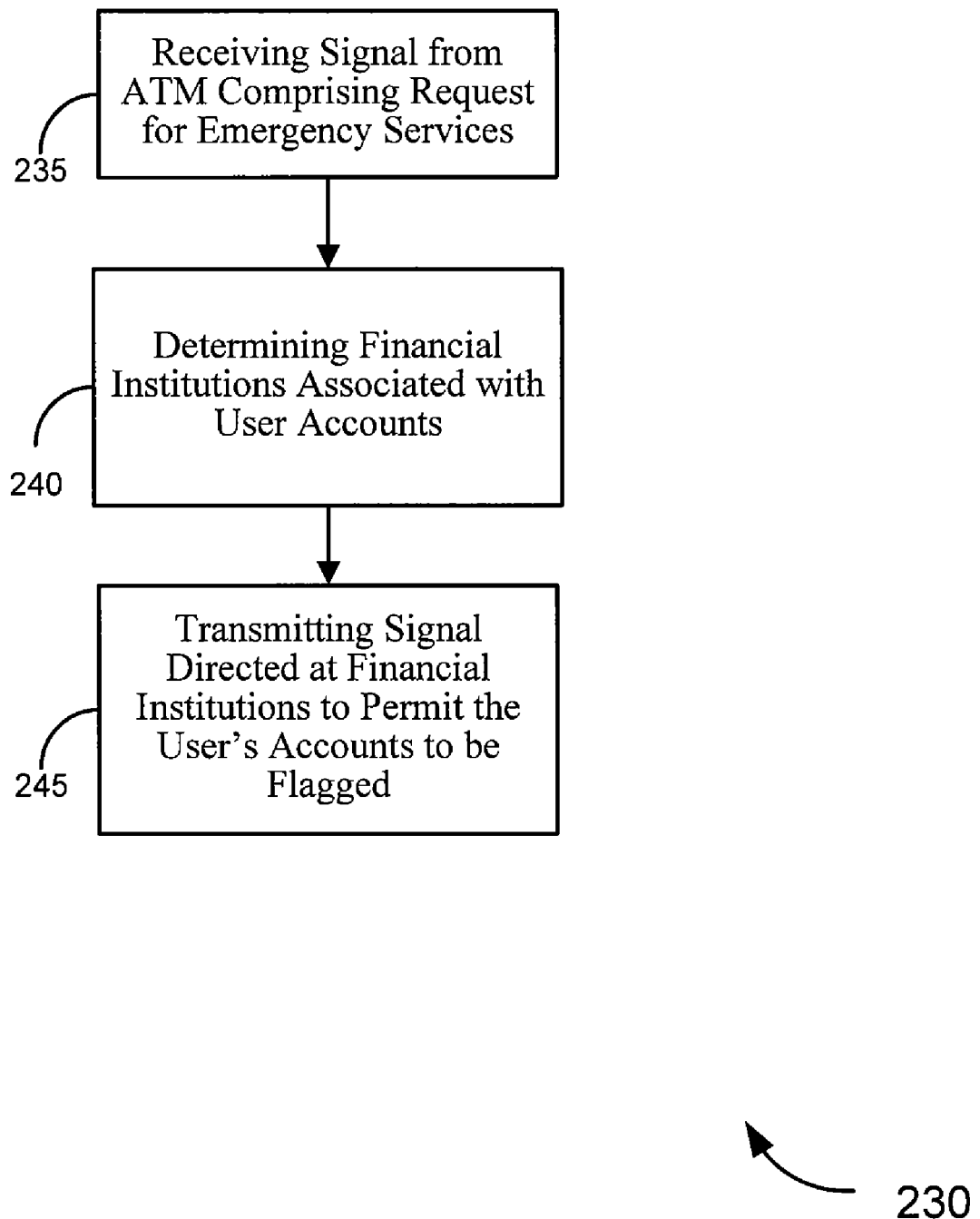
FIG. 2B is a flow diagram that illustrates a method that may be used to facilitate contact with an emergency services provider over an ATM network according to various embodiments of the present invention.

FIG. 2B illustrates another method 230 for contacting financial institutions when a user's accounts may be subject to unauthorized activities, such as when a user's credit card is stolen. As illustrated in step 235, a signal is received from an ATM which includes a request for emergency services. In step 240, a determination is made as to which financial institutions are associated with user accounts that are the subject of the emergency request. For example, if a user enters an emergency PIN into the ATM, a query may be performed to determine financial accounts and associated financial institutions to which the emergency PIN relates. In step 245, a signal is transmitted to the financial institutions to permit the user's accounts to be flagged or otherwise processed.

Figure 3:
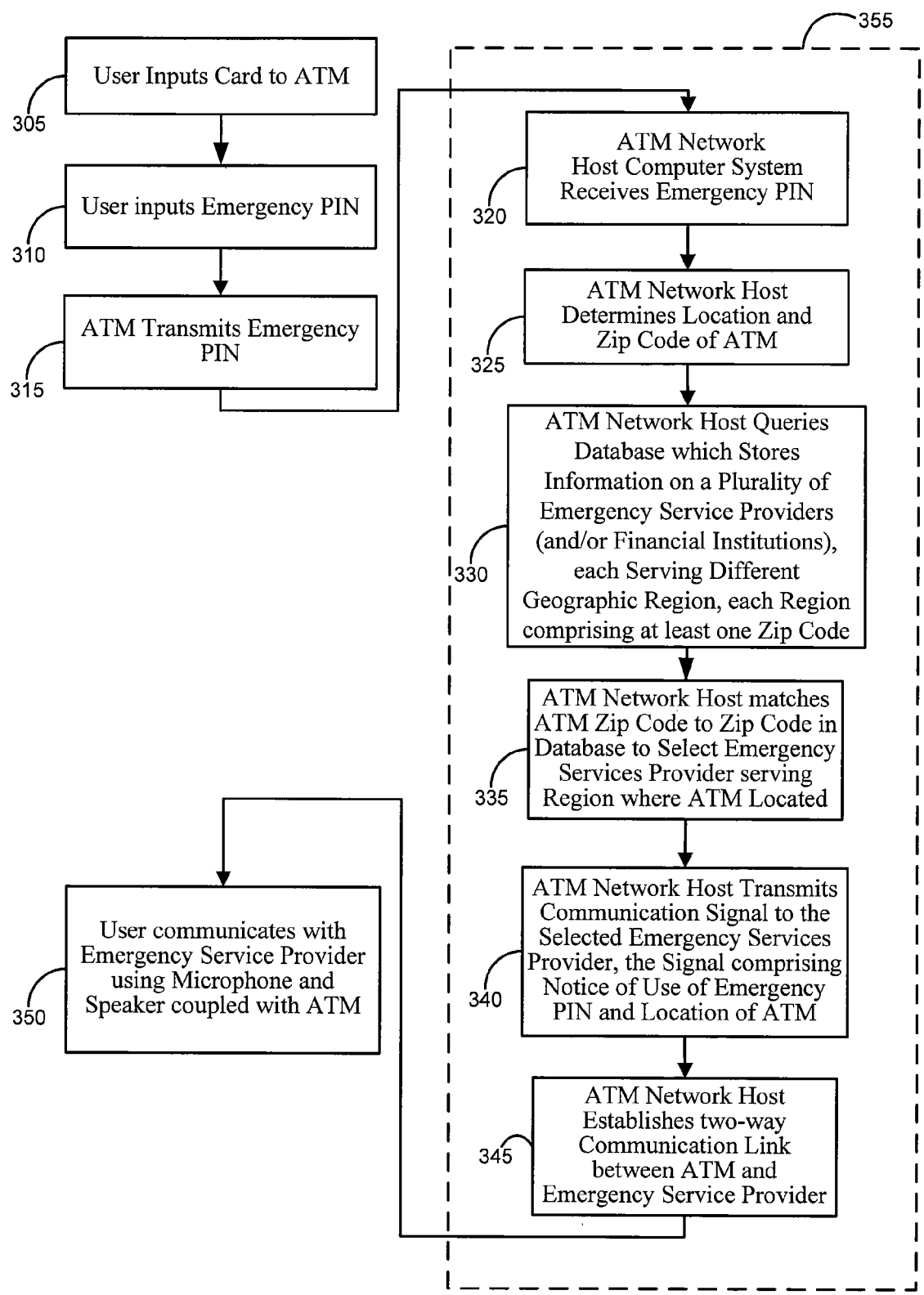
FIG. 3 is a flow diagram that illustrates a method that may be used to contact an emergency services provider from an ATM according to various embodiments of the present invention.

FIG. 3 sets forth an alternative exemplary embodiment of the invention, illustrating an example 300 of a method that may be used to contact an emergency services provider from an ATM 105 according to various embodiments of the present invention. At block 305, a user may input a card into an ATM 105, and may input an emergency PIN into the keypad of the ATM 105 at block 310. The ATM 105, at block 315, may transmit the emergency PIN. The ATM Network Host 120 receives the emergency PIN at block 320.

The ATM Network Host 120 may determine, at block 325, the location and zip code of the ATM 105. At block 330, the ATM Network Host 120 may query the Database 125 which stores information on a plurality of emergency service providers 140. Each provider may serve a different geographic region, and each region may comprise one or more zip codes. At block 345, the ATM Network Host 120 may match the zip code of the ATM 105 with a zip code in the Database 125 to select an emergency services provider 140 serving the region in which the ATM 105 is located.

At block 340, the ATM Network Host 120 may transmit a communications signal directed at the selected emergency services provider 140 as an alternative, a signal may be sent to financial institutions so the user accounts may be processed according to the emergency request. The signal may comprise notice that an emergency PIN has been selected, and further comprise the location of the ATM 105. At block 340, the ATM Network Host 120 may establish a two-way communication link between the ATM 105 and the emergency services provider 140. At block 350, the user may communicate with the emergency services provider 140 over the established two-way link, using the microphone and speaker coupled with the ATM 105. The area designated by a dashed line and identified by reference numeral 355 designates actions that may be undertaken by an ATM Network Host 120.

Figure 4:
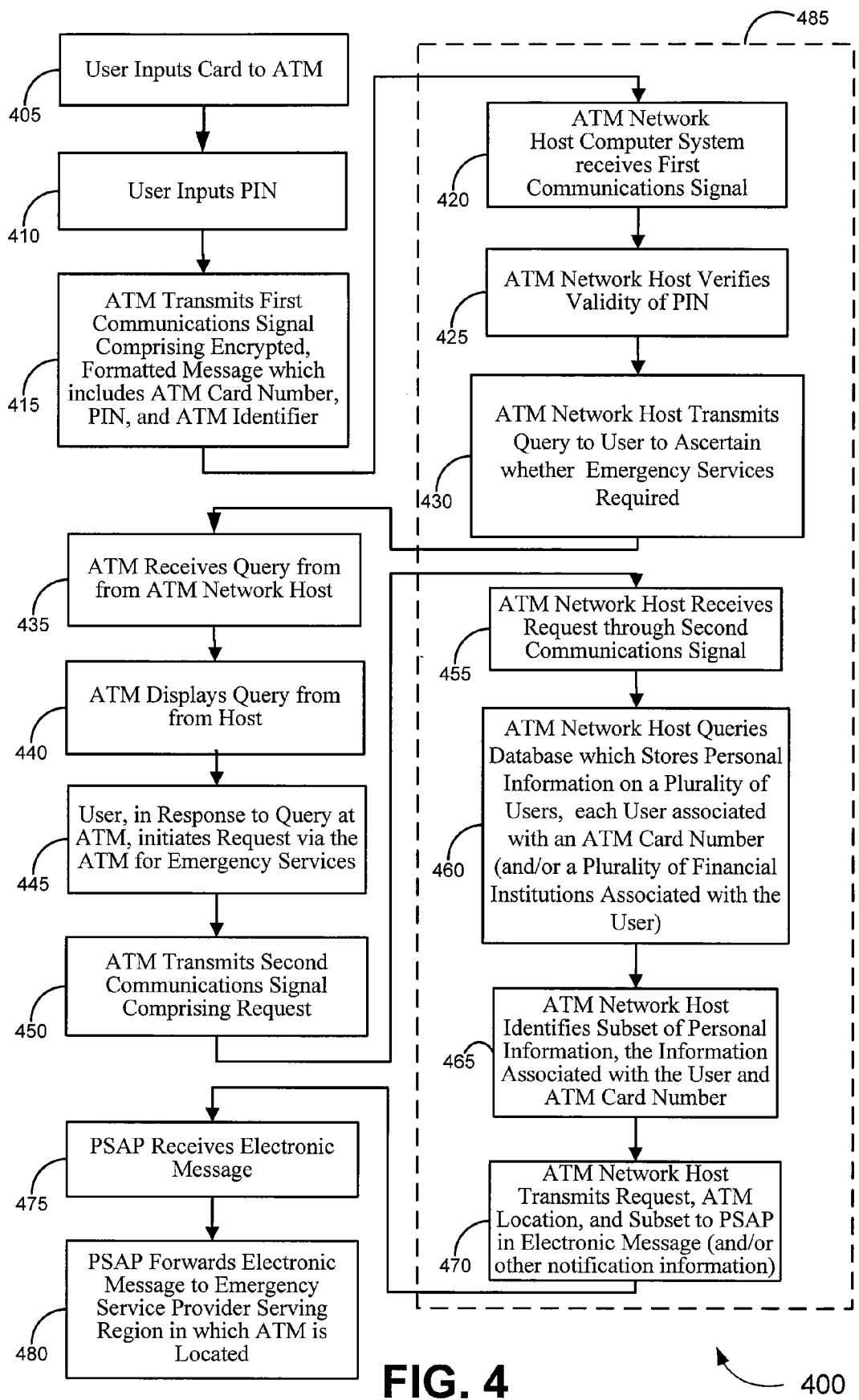
FIG. 4 is a flow diagram that illustrates a method that may be used to contact an emergency services provider from an ATM via a PSAP according to various embodiments of the present invention.

FIG. 4 sets forth yet another exemplary embodiment of the invention, illustrating an example 400 of a method that may be used to contact an emergency services provider 140 from an ATM 105 via a PSAP 135 according to various embodiments of the present invention. At block 405, a user may input a card into an ATM 105, and may input a regular PIN into the keypad of the ATM 105 at block 410. The ATM 105, at block 415, may transmit a first communications signal comprising an encrypted, formatted message which includes an ATM card number, the PIN, and an ATM identifier. The ATM Network Host 120 may receive the first communications signal at block 420.

At block 425, the ATM Network Host 120 may verify the validity of the PIN, comparing the entered PIN to the PIN authorized for the card number. At block 430, the ATM Network Host 120 may transmit a query back to the ATM 105 to ascertain whether the user is in need of emergency services. At block 435, the ATM 105 may receive the query, and may display the query at block 440. The user, at block 445, may respond to the query by affirming or otherwise initiating a request for emergency services. The input may simply comprise selecting a button or other icon on the keypad or touch-screen. In alternative embodiments, the input may comprise further input with additional information provided (e.g., a description of the emergency situation). At block 450, the ATM 105 may transmit a second communications signal comprising the request, and the additional input information. The ATM Network Host 120 may receive the second communications signal at block 455.

At block 460, the ATM Network Host 120 may query the Database 125 which stores personal information on a plurality of users, each user associated with an ATM card number. At block 465, the ATM Network Host 120 may identify a subset of personal information associated with the user, wherein the personal information is identified via the ATM number. At block 470, the ATM Network Host 120 may transmit the request, the ATM location, and the subset of the personal information to a PSAP 135 in an electronic message. At block 475, the PSAP may receive the electronic message. At block 480, the PSAP 135 (serving as an intermediary in this case), may forward the electronic message to an emergency services provider 140 serving the region in which the ATM 105 is located. The area designated by a dashed line and identified by reference numeral 485 designates actions that may be undertaken by an ATM Network Host 120. As an alternative, ATM Network Host 120 may be used to send notifications to financial institutions for accounts associated with the emergency request. In this way, a user's financial accounts may be frozen or otherwise processed according to emergency rules dictated by the user. Also, a notification may be sent to the user to notify the user of the emergency request.

Figure 5:
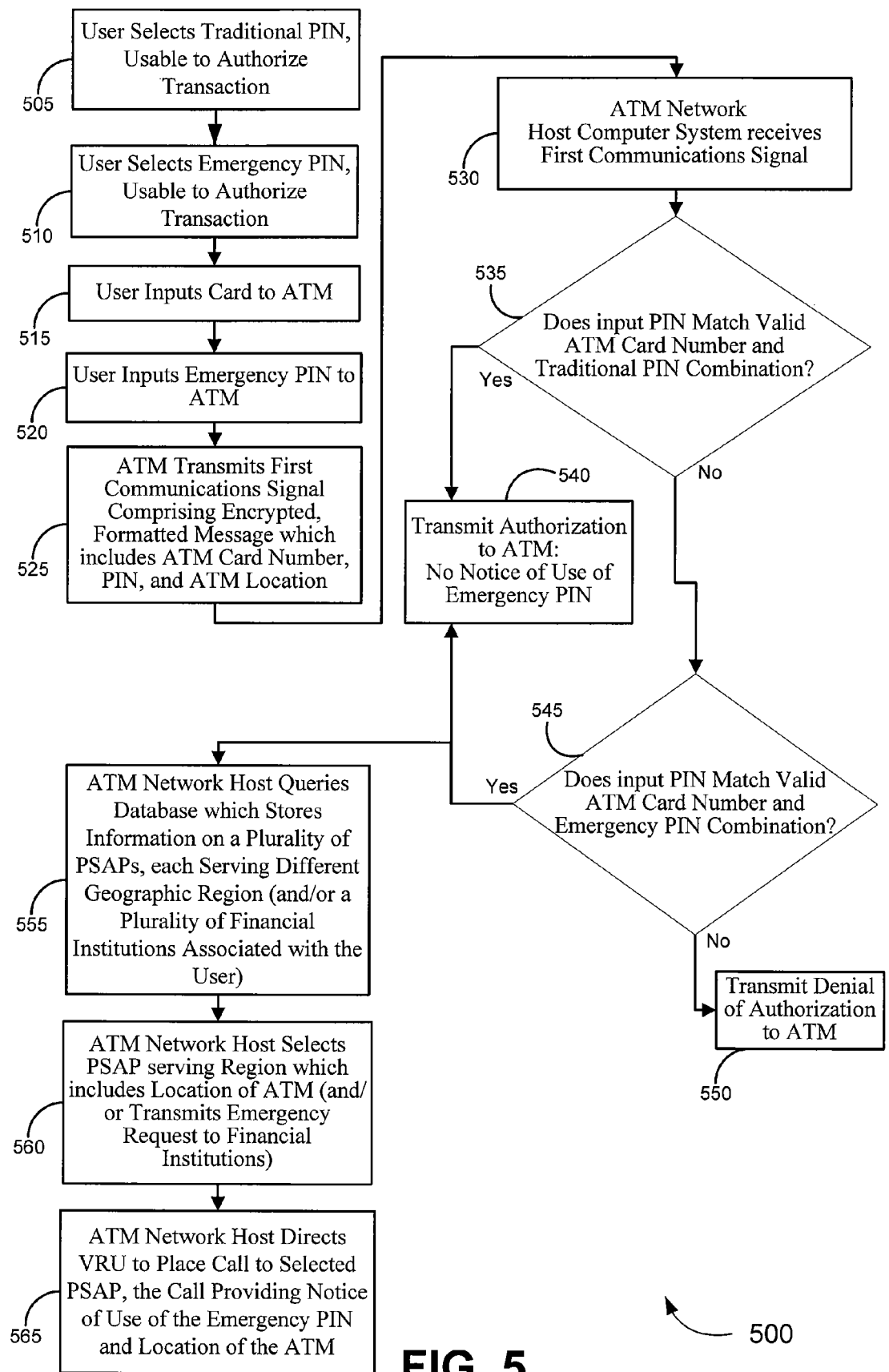
FIG. 5 is a flow diagram that illustrates a method for contacting a local PSAP from an ATM using an emergency PIN according to various embodiments of the present invention.

FIG. 5 sets forth still another exemplary embodiment of the invention, illustrating an example 500 of a method that may be used to contact an emergency services provider 140 from an ATM 105 according to various embodiments of the present invention. At block 505, a user may select a traditional PIN, usable to authorize a transaction at an ATM 105. The selection may take place, for example, when setting up an account or over the Internet. At block 510, the user may select an emergency PIN, which is also usable to authorize an ATM transaction. Use of the emergency PIN may also initiate a request to contact emergency services without any notification at the ATM 105. In this way, it may function like a silent alarm. At block 515, a user may input a card into an ATM 105, and may input an emergency PIN into the keypad of the ATM 105 at block 520. The ATM 105, at block 525, may transmit a first communications signal comprising an encrypted, formatted message which includes an ATM card number, the emergency PIN, and the location of the ATM 105. The ATM Network Host 120 may receive the first communications signal at block 530.

At block 535, the ATM Network Host 120 may decrypt the signal, and process the formatted message to determine whether the PIN matches the traditional PIN associated with the ATM card number. If so, the ATM Network Host 120 may authorize the transaction at block 540. If not, a check for the emergency PIN may be conducted at block 545. If neither PIN matches the ATM card number, the transaction authorization request may be denied at block 550. If the input PIN matches the emergency PIN associated with the ATM card, the transaction may be approved at block 540, with no notice of the use of the emergency PIN at the ATM 105. With use of the emergency PIN, the ATM Network Host 120 may also query the Database 125 which stores information on a plurality of PSAPs 135 at block 555. The PSAPs 135 each comprise emergency services providers 140 in this embodiment, with each serving a different geographic region. At block 560, the ATM Network Host 120 selects a PSAP 135 serving a region which includes the location of the ATM 105. The ATM Network Host 120, at block 565, may direct the VRU 125 to place a telephone call to the selected PSAP 135, the call information including the location of the ATM 105 and notice of use of the emergency PIN.

Figure 6:
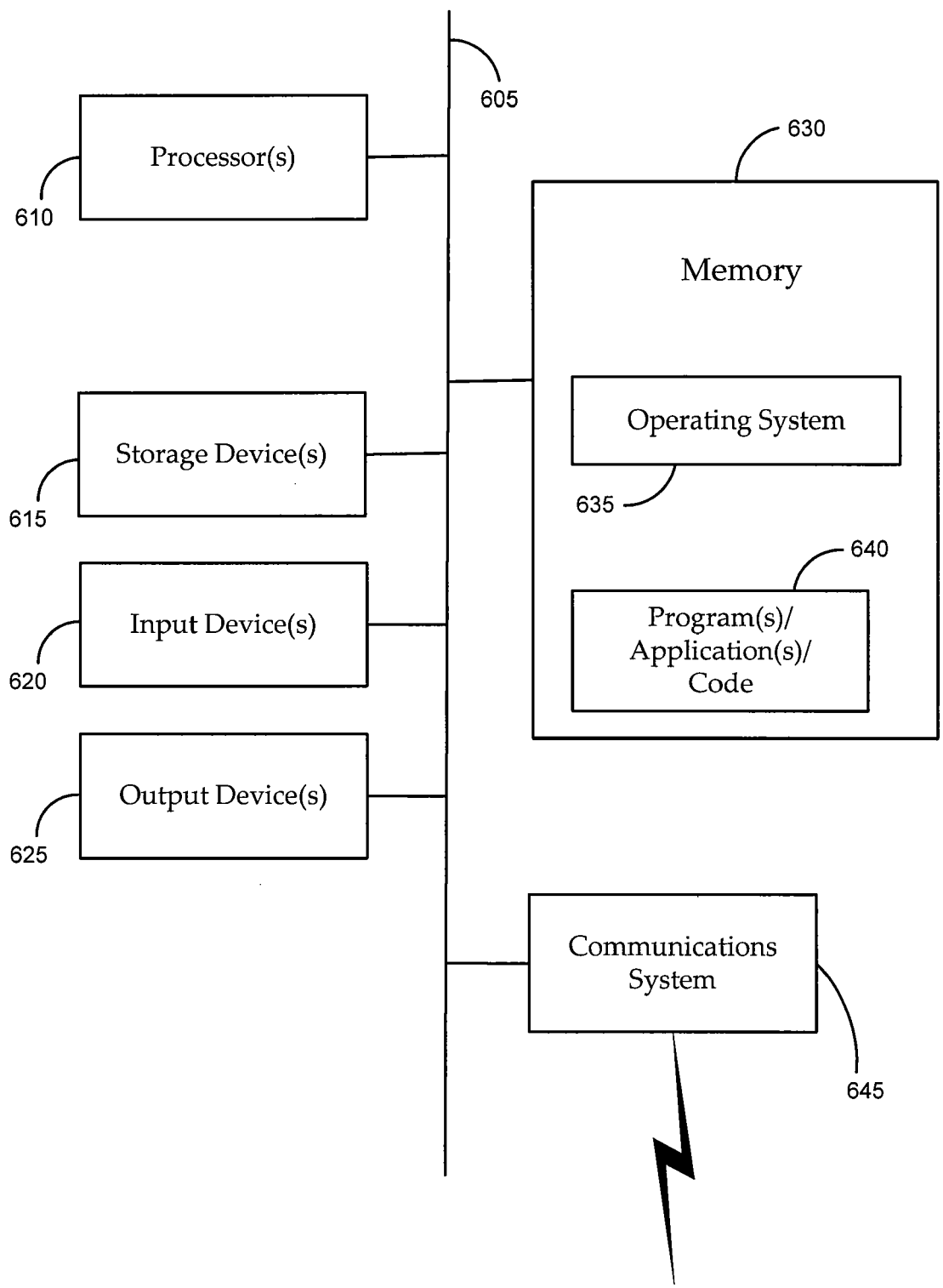
FIG. 6 is a schematic diagram that illustrates a representative device structure that may be used in various embodiments of the present invention.

IV. Computing Device Structure: A device structure 600 that may be used for a computer, server, ATM network host computer system 120, PSAP, VRU, or other computing device described herein is illustrated with the schematic diagram of FIG. 6. This drawing broadly illustrates how individual system elements of each of the aforementioned devices may be implemented, whether in a separated or more integrated manner. The exemplary structure is shown comprised of hardware elements that are electrically coupled via bus 605, including processor(s) 610 (which may further comprise a DSP or special-purpose processor), storage device(s) 615, input device(s) 620, and output device(s) 625. The storage device(s) 615 may comprise a computer-readable storage media reader connected to any computer-readable storage medium, the combination comprehensively representing remote, local, fixed, or removable storage devices or storage media for temporarily or more permanently containing computer-readable information. The communications system 645 may comprise a wired, wireless, or other type of interfacing connection that permits data to be exchanged with other devices. The communications system(s) 645 may permit data to be exchanged with a network (including, without limitation, the Network 175).

The structure 600 may also comprise additional software elements, shown as being currently located within working memory 630, including an operating system 635 and other code 640, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

V. Conclusion: It should be noted that the methods, systems and devices discussed above are intended merely to be exemplary in nature. It must be stressed that various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

It should be noted that the methods, systems and devices discussed above are intended merely to be exemplary in nature. Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Also, it is worth noting that technology evolves, and that terms should be interpreted accordingly.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure.

Moreover, as disclosed herein, the terms "storage medium" or "storage device" may represent one or more devices for storing data, including read only memory (ROM), random access memory (RAM), magnetic RAM, core memory, magnetic disk storage mediums, optical storage mediums, flash memory devices or other machine readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A method for facilitating contact with an emergency services provider from an Automatic Teller Machine ("ATM") comprising: receiving, at and ATM network host computer system an initiating communications signal from the ATM comprising an encrypted, formatted message including an ATM card number and a personal identification number ("PIN"); receiving, at the ATM network host computer system, a first communications signal from the ATM comprising a request for emergency service from a user of the ATM; wherein the request for emergency services comprises a response to a query displayed at the ATM to ascertain whether emergency services are required; determining at least one financial account associated with the user; and transmitting a second communications signal to a financial institution computer system, wherein the second communications signal comprises information of the user that may have been stolen; and further comprising freezing the financial account upon receipt of the second communications signal.

2. The method of claim 1, wherein the financial account is selected from a group consisting of a credit card account, a debit card account, a stored value account, a phone account, a brokerage account, a checking account and a savings account.

3. The method of claim 1, wherein the request for emergency services comprises input of the personal identification number ("PIN") by the user.

4. The method of claim 1, wherein the first communications signal comprises the encrypted, formatted message including the ATM card number, the personal identification number ("PIN"), and an identifier for the ATM.

5. The method of claim 4, wherein the identifier for the ATM includes location information.

6. The method of claim 1, wherein a user is associated with a first PIN and a second PIN, and the selection of one of the PINs by the user authorizes a transaction at the ATM from an account associated with the user;
   the other PIN further comprises an emergency PIN, wherein selection by the user initiates the request for emergency services; and
   the transmitting step is undertaken without any notice of receipt of the request for emergency services from the ATM network host computer system to the ATM.

7. The method of claim 1, wherein the first communications signal comprises the initiating communication signal.

8. The method of claim 7, wherein the response comprises the selection of an option from a graphical menu displayed on a screen of the ATM.

9. The method of claim 1, wherein the determining step further comprises:
   communication with a database which stores information on a plurality of financial accounts and associated financial institutions; and a query of the database by the ATM network host computer system to determine the financial institution that is associated with the user's financial account.

10. A system for facilitating contact with an emergency services provider from an Automatic Teller Machine ("ATM") comprising: an ATM, wherein the ATM is configured to: receive input from a user comprising a request for emergency services; and transmit a first communications signal comprising a request for emergency service from a user; and an ATM network host computer system, in communication with the ATM, wherein the ATM network host computer system is configured to: receive the first communications signal comprising an encrypted, formatted message including an ATM card number, a personal identification number/ ("PIN"), and an identifier for the ATM; determine at least one financial account associated with the user; and transmit a second communications signal to a financial institution computer system that account information of the user that may have been stolen; and further comprising freezing the financial account upon receipt of the second communications signal.

11. The system of claim 10, wherein the financial account is selected from a group consisting of a credit card account, a debit card account, a stored value account, a phone account, a brokerage account, a checking account and a savings account.

12. The system of claim 10, wherein the request for emergency services comprises input of the personal identification number ("PIN") by the user.

13. The system of claim 10, further comprising a database in communication with the ATM network host computer system.

14. The system of claim 13, wherein the database stores information on a plurality of financial institutions; and
the ATM network host computer system is configured to query the database to determine the financial institution that is associated with the user's financial account.

15. The system of claim 10, wherein:
the user comprises a user identifier selected from the group consisting of: an ATM card account number, a credit card account number, a social security number, a bank account number, a savings account number, a stored-value account number, a personal identification number, a unique character set, a unique data set, and any combination thereof; and
the ATM card number comprises a number printed upon the ATM card.

16. The system of claim 10, wherein the ATM is further configured to:
delay dispersing cash to the user in response to the input.

17. The system of claim 10, wherein the ATM is further configured to:
capture an image, in response to the input, of an area adjacent the ATM with a camera which is communicatively coupled with the ATM.

18. An ATM network host computer system, the system having at least one computer readable storage medium having at least one computer-readable program for operation of the computer system, wherein the computer-readable program includes instructions to: receive from the ATM an encrypted, formatted message including an ATM card number, a personal identification number ("PIN"), and an identifier for the ATM, the message comprising a first communications signal including request for emergency services from a user; determine at least one financial account associated with the user; and transmit a second communications signal directed to a financial institution associated with the user's financial account indicating that the user's account may have been compromised; and further comprising freezing the financial account upon receipt of the second communications signal.

* * * * *

UNITED STATES PATENT AND TRADEMARK OFFICE
CERTIFICATE OF CORRECTION

| | | |
|---|---|---|
| PATENT NO. | : 7,549,574 B2 | |
| APPLICATION NO. | : 11/534530 | |
| DATED | : June 23, 2009 | |
| INVENTOR(S) | : Crowell et al. | |

It is certified that error appears in the above-identified patent and that said Letters Patent is hereby corrected as shown below:

Claim 1, column 14, lines 17-18, delete "an emergency services provider", and insert --financial institution computer system--;

Claim 1, column 14, line 19, delete "and", and insert --an--;

Claim 1, column 14, line 20, delete "system an", and insert --system, an--;

Claim 1, column 14, line 30, delete "a financial", and insert --the financial--;

Claim 1, column 14, lines 33-34, delete "; and further comprising freezing the financial account upon receipt of the second communications signal", and insert --, wherein the financial account of the user is frozen after receipt of the second communications signal--;

Claim 10, column 15, lines 4-5, delete "an emergency services provider", and insert --financial institution computer system--;

Claim 10, column 15, line 14, delete "number/", and insert --number--;

Claim 10, column 15, line 17, delete "a financial", and insert --the financial--;

Claim 10, column 15, lines 19-21, delete "; and further comprising freezing the financial account upon receipt of the second communications signal", and insert --, wherein the financial account of the user is frozen after receipt of the second communications signal--;

UNITED STATES PATENT AND TRADEMARK OFFICE
CERTIFICATE OF CORRECTION

PATENT NO. : 7,549,574 B2
APPLICATION NO. : 11/534530
DATED : June 23, 2009
INVENTOR(S) : Crowell et al.

It is certified that error appears in the above-identified patent and that said Letters Patent is hereby corrected as shown below:

Claim 18, column 16, lines 33-34, delete "; and further comprising freezing the financial account upon receipt of the second communications signal", and insert --, wherein the financial account of the user is frozen after receipt of the second communications signal--;

Signed and Sealed this

Fifteenth Day of September, 2009

David J. Kappos
*Director of the United States Patent and Trademark Office*